(12) United States Patent
Xu et al.

(10) Patent No.: US 8,830,620 B2
(45) Date of Patent: Sep. 9, 2014

(54) METHOD FOR REDUCING VARIATION RANGE OF SKEW ANGLE OF MAGNETIC WRITING POLE AND MAGNETIC WRITING POLE USING THE METHOD

(71) Applicant: Huazhong University of Science and Technology, Wuhan (CN)

(72) Inventors: Shu Xu, Wuhan (CN); Bo Liu, Wuhan (CN); Jincai Chen, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 14/094,781

(22) Filed: Dec. 2, 2013

(65) Prior Publication Data
US 2014/0218818 A1  Aug. 7, 2014

(30) Foreign Application Priority Data

Feb. 4, 2013  (CN) .......................... 2013 1 0042443

(51) Int. Cl.
*G11B 5/00* (2006.01)
(52) U.S. Cl.
USPC .......................................................... 360/76

(58) Field of Classification Search
USPC ................................ 360/75, 76, 59, 31, 72.1
See application file for complete search history.

(56) References Cited

U.S. PATENT DOCUMENTS 8,018,672 B2 *  9/2011  Maeda et al. ................... 360/59

* cited by examiner

*Primary Examiner* — Nabil Hindi
(74) *Attorney, Agent, or Firm* — Matthias Scholl P.C.; Matthias Scholl

(57) ABSTRACT

A method for reducing skew angle variation range in a shingled magnetic recording system, the method including the following steps: 1) determining whether a starting magnetic track is in an inner recording zone, if yes, the process proceeds to step (2), otherwise the process proceeds to step (4); 2) using an inner writing corner to start shingled magnetic recording at a starting track; 3) using a shingled magnetic method to write rest magnetic tracks sequentially by the inner writing corner, keeping a writing pole moving in a direction from an inner recording zone to an outer recording zone; 4) determining whether the starting magnetic track is in the outer recording zone; 5) using an outer writing corner to start shingled magnetic recording at the starting track; and 6) using the shingled magnetic method to write the rest magnetic tracks sequentially by the outer writing corner.

6 Claims, 10 Drawing Sheets

METHOD FOR REDUCING VARIATION RANGE OF SKEW ANGLE OF MAGNETIC WRITING POLE AND MAGNETIC WRITING POLE USING THE METHOD

CROSS-REFERENCE TO RELATED APPLICATIONS

Pursuant to 35 U.S.C. §119 and the Paris Convention Treaty, this application claims the benefit of Chinese Patent Application No. 201310042443.2 filed Feb. 4, 2013, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a computer storage device, and more particularly, to a method for reducing a variation range of a skew angle of a magnetic writing pole and a magnetic writing pole using the same.

2. Description of the Related Art

The hard-disk storage technology has been the main computer storage technology all the years. Currently, structure and operation mechanism of the hard disk drive still use a so-called 'Winchester mode', in which a magnetic head moves in a radial direction upon its corresponding disk surface whilst the disk rotates at high speed in a sealing cavity. As shown in FIG. 1, a conventional hard disk drive 10 includes one disk or multiple disks, a disk-driving motor, a read-write head assembly, a magnetic head driving device, and a read-write control circuit plus data read/write electronics and motor controlling electronics. The disk 11 is a magnetic storage medium operating to record information and rotates at high speed under driving of a spindle motor 12. The read-write head assembly includes a read-write head, a slider 13, and a suspension arm 14. The read-write head is packaged on the slider 13. In operation, a magnetic head driving device (voice coil motor) 16 drives the suspension arm 14 and the slider 13 to rotate around a pivot shaft 15 so that the slider 13 can be positioned above a predetermined magnetic track. Meanwhile, the disk 11 rotates at high speed, and the read-write head is positioned at a predetermined sector thereof, and thus facilitating data reading and writing thereon as flying over the disk surface thereof. FIG. 2 is a top view of a magnetic writing head. The magnetic writing head comprises a magnetic writing pole 23 and a return pole 22, both packaged on the slider 21. The magnetic writing pole 23 operates to write bit information.

With increase in a recording density of hard disk drives, the areal size of each recording bit gradually decreases. The magneto-crystalline anisotropy of the recording medium must be large enough or further increased to ensure the thermal stability of a recorded bit and, as a result, the magnetic writing field of the magnetic writing head needs to be increased. In a conventional perpendicular magnetic recording system, the width of a recorded magnetic track thereof is approximately the same as that of a magnetic writing pole. Therefore, as the recording density increases, the width of the magnetic track decreases and, therefore, the width of the magnetic writing pole needs to be reduced accordingly. However, reduction in the width of the magnetic writing pole often results in decrease of the magnetic writing field. Shingled magnetic recording scheme has been proposed to provide strong writing field as track density increases. In a shingled magnetic recording system, the width of the magnetic writing pole is no longer limited by the width of the magnetic track and a wider magnetic writing pole covering multiple magnetic tracks is used for recording and, therefore, a large enough writing magnetic field can be obtained. As shown in FIG. 3, the shingled magnetic recording system employs a method of partly overwriting a previous recorded magnetic track to record. The magnetic writing pole 30 in FIG. 3 sequentially writes magnetic tracks 31, 32, 33 and 34 from the top to the bottom, each magnetic track is partially overlapped with a previous recorded magnetic track (for example the magnetic track 33 overwrites part of the magnetic track 32, and the magnetic track 34 overwrites part of the magnetic track 33). The wider the writing pole, the stronger the writing field and the higher the recording density will be. It should be noted that a writing corner 301 of the magnetic writing pole 30 is the place having most significant effect on the recording performance of the shingled magnetic recording system.

In a shingled magnetic recording system as shown in FIG. 4, a magnetic writing pole 40 writes a current recording bit 422. The magnetic writing pole 40 needs to ensure that a previous recorded bit 421 and a previous recorded magnetic track 41 are not erased or partially erased. Bits following the current recording bit 422 that has been overwritten is to be rewritten during sequential movement of the magnetic writing pole 40. In addition, an angle between the normal direction of a trailing side of the magnetic writing pole 40 and the magnetic track 42 is referred to as a 'skew angle'. As the magnetic writing head moves in a radial direction with the suspension arm as shown in FIG. 1, the skew angle θ increases or decreases accordingly. As skew angle θ varies, the erasing effect of the magnetic writing pole on a previous recorded bit (for example, bit 421) or a previous recorded magnetic track (for example, magnetic track 41) increases. For example, as the skew angle θ increases, the magnetic field generated around an edge 'a' of the magnetic writing pole 40 will increase possibility of erasing the previous recorded bit 421, and as the skew angle θ decreases, the magnetic field generated around an edge 'b' of the magnetic writing pole 40 will increase possibility of erasing the previous recorded magnetic track 41. FIG. 5 illustrates relationship between a write-in error rate of the shingled magnetic recording system and a variation range of the skew angle. It can be seen that as the variation range of the skew angle increases, the write-in error rate increases significantly Therefore, it is of great importance for the shingled magnetic recording system to reduce the variation range of the skew angle θ so as to reduce the interference of the magnetic writing pole 40 to the previous recorded bit 421 and the previous recorded magnetic track 41.

So far, the magnetic writing pole of a shingled magnetic recording system uses only one writing corner for shingled magnetic recording. Therefore, as the magnetic writing pole moves from the innermost track to the outermost track in a radial direction, the writing corner moves along therewith and crosses all magnetic tracks. A variation range of a skew angle θ thereof is comparatively large (normally 18°-30°, and thus a high write-in error rate of the shingled magnetic recording system happens at those tracks corresponding to high skew angle.

SUMMARY OF THE INVENTION

In view of the above-mentioned problems, it is an objective of the invention to provide a method for reducing the skew angle variation range in the existing shingled magnetic recording system. This invention provides a method which can significantly reduce the writing skew angle variation range of a giving writing corner. Instead of using one corner for the shingled writing over the whole disk surface, this invention uses inner writing corner for inner zone writing and outer writing corner for outer zone writing. As a result, the corresponding skew angle variation range of each corner is reduced significantly and so is the corresponding write-in error rate.

In accordance with an exemplary embodiment of the invention, provided is a method for reducing skew angle variation range in a shingled magnetic recording system, the method comprising steps of:

(1) determining whether a starting magnetic track is in an inner recording zone, if yes, the process proceeds to step (2), otherwise the process proceeds to step (4);

(2) using an inner writing corner to start shingled magnetic recording at a starting track, the process then proceeds to step (3);

(3) using a shingled magnetic method to write rest magnetic tracks sequentially by the inner writing corner, keeping a writing pole moving in a direction from an inner recording zone to an outer recording zone, until all the information needing to be written into the inner recording zone has been recorded;

(4) determining whether the starting magnetic track is in the outer recording zone, if yes, the process proceeds to step (5);

(5) using an outer writing corner to start shingled magnetic recording at the starting track, the process then proceeds to step (6); and (6) using the shingled magnetic method to write the rest magnetic tracks sequentially by the outer writing corner, keeping the writing pole moving in a direction from the outer recording zone to the inner recording zone, until all the information needing to be written into the outer recording zone has been recorded.

The inner recording zone comprises all the tracks between an innermost track of the magnetic disk and an inner boundary of the middle recording zone, the outer recording zone comprises all the tracks between an outer boundary of the middle recording zone and an outermost track of the magnetic disk.

The inner boundary and the outer boundary of the middle recording zone are respectively the innermost and the outermost track boundaries of the magnetic track(s) in the middle recording zone. There could be only one track or multiple tracks in the middle recording zone.

Advantages of the method over the prior art comprise: the invention reduces the skew angle variation range of each writing corner, and thus decreasing the corresponding write-in error rate: since steps (3) and (6) are used, the magnetic writing pole uses two different writing corners to write corresponding recording zones of the magnetic disk, and the skew angle variation ranges in different recording zones are both smaller than that of writing all the magnetic tracks by one writing corner only. Therefore, the write-in error rate corresponding to each recording zone is smaller than that of recording the whole disk with one writing corner.

It is another objective of the invention to provide a magnetic writing pole using the above-mentioned method to reduce skew angle variation range. In an existing shingled magnetic recording system, because only one writing corner is used to write the whole disk surface, the skew angle variation range corresponding to the single writing corner is large. The invention aims at addressing the problem that the skew angle variation range is large, and reducing the skew angle variation range and decreasing the corresponding write-in error rate of the system, using two writing corner to record different data zones.

In accordance with another embodiment of the invention, provided is a magnetic writing pole using the above-mentioned method for reducing the skew angle variation range.

Advantages of the magnetic writing pole over the prior art comprise: the invention reduces the variation range of the skew angle corresponding to one giving writing corner, and thus decreasing the write-in error rate of the system: since steps (3) and (6) are used, the magnetic writing pole uses two different writing corners to write different recording zones of the magnetic disk, and the skew angle variation range corresponding to each writing corner is smaller than that of writing all the magnetic tracks by one writing corner only.

In accordance with still another embodiment of the invention, provided is a magnetic writing pole using the above-mentioned method for reducing the skew angle variation range. The magnetic writing pole comprises a writing corner for writing the inner recording zone, and a writing corner for writing the outer recording zone. The writing corner angle $\alpha 1$ for writing the inner recording zone is adjustable between 50° and 120°, and the writing corner angle $\alpha 2$ for writing the outer recording zone is adjustable between 50° and 120°.

Advantages of the magnetic writing pole over the prior art comprise: since two adjustable writing corners are used to record two different data zones, the skew angle variation range of each writing corner is significantly reduced compared with that of writing the whole disk with one corner only, and thus the corresponding write-in error rate of each corner is decreased.

In accordance with a further embodiment of the invention, provided is a magnetic writing pole using the above-mentioned method for reducing the skew angle variation range. The magnetic writing pole comprises a writing corner of the inner recording zone, and a writing corner of the outer recording zone. The writing corner angle $\alpha 1$ of the inner recording zone is adjustable between 50° and 120°, and the writing corner angle $\alpha 2$ of the outer recording zone is adjustable between 50° and 120°. An original skew angle of the writing corner of the inner recording zone is adjustable between −30° and 30°, and an original skew angle of the writing corner of the outer recording zone is adjustable between −30° and 30°.

Advantages of the magnetic writing pole over the prior art comprise: since two adjustable writing corners are used to record different data zones, and the original skew angles of the two writing corners can be adjusted, the skew angle variation range of each writing corner is reduced, compared with that of writing the whole disk with one corner only, and thus the corresponding write-in error rate of each corner is decreased.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
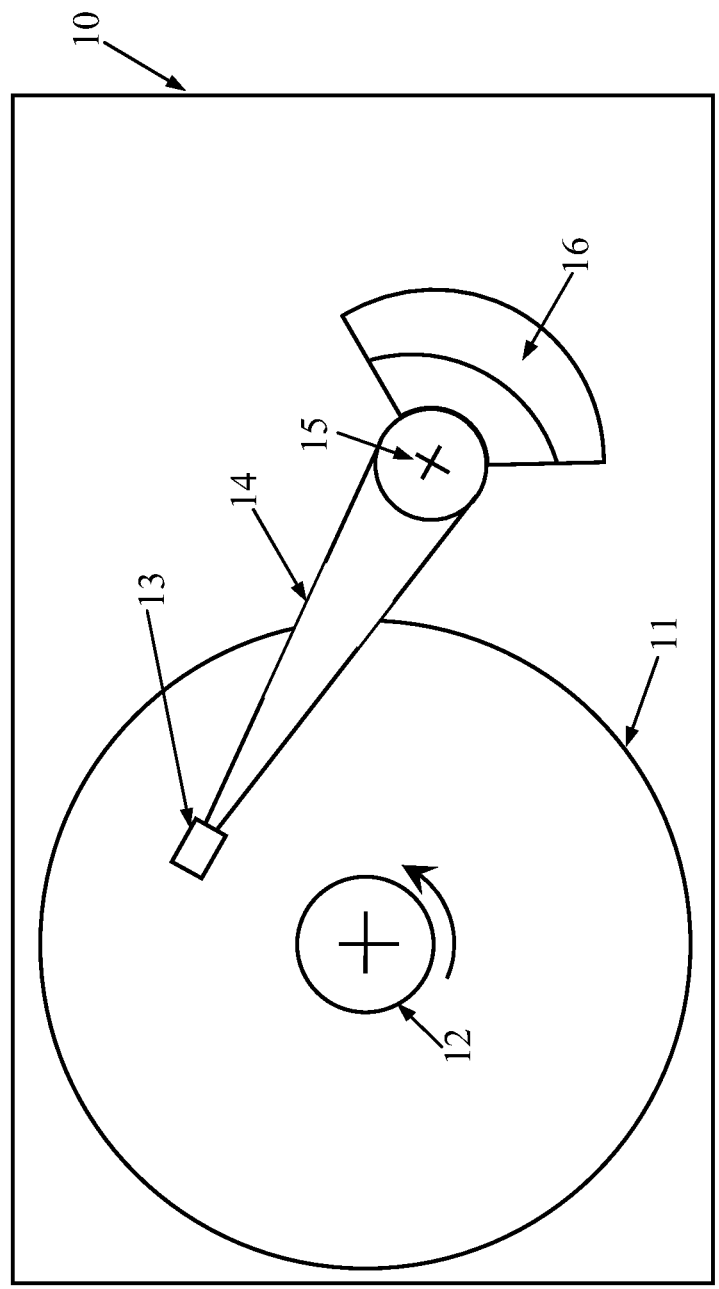
FIG. 1 is a partially schematic top view of a perpendicular magnetic recording disk drive.
Figure 2:
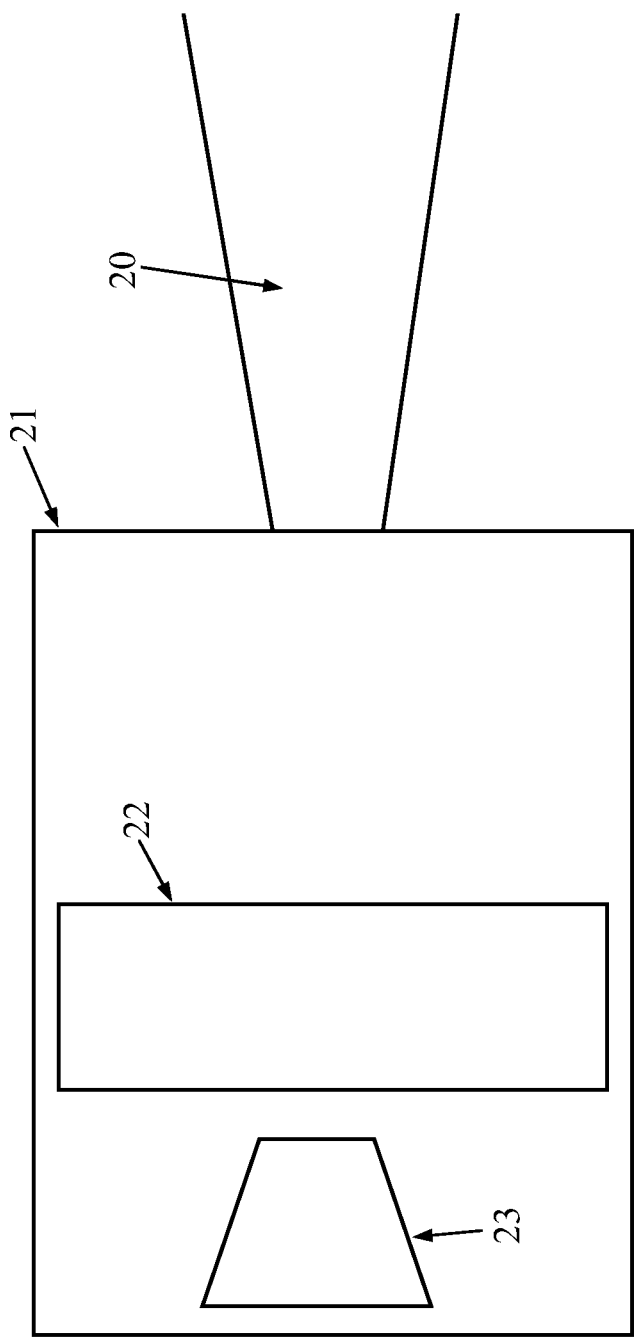
FIG. 2 is an air bearing surface (ABS) view of a perpendicular magnetic writing head in the prior art.
Figure 3:
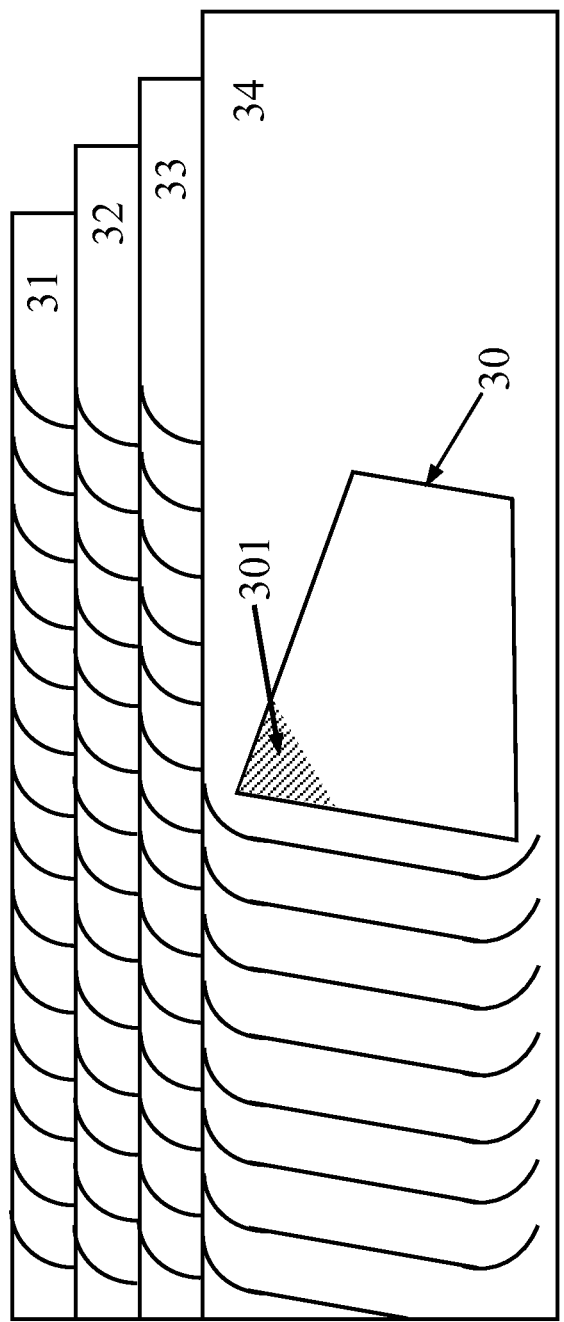
FIG. 3 is the illustration of shingled magnetic recording method.
Figure 4:
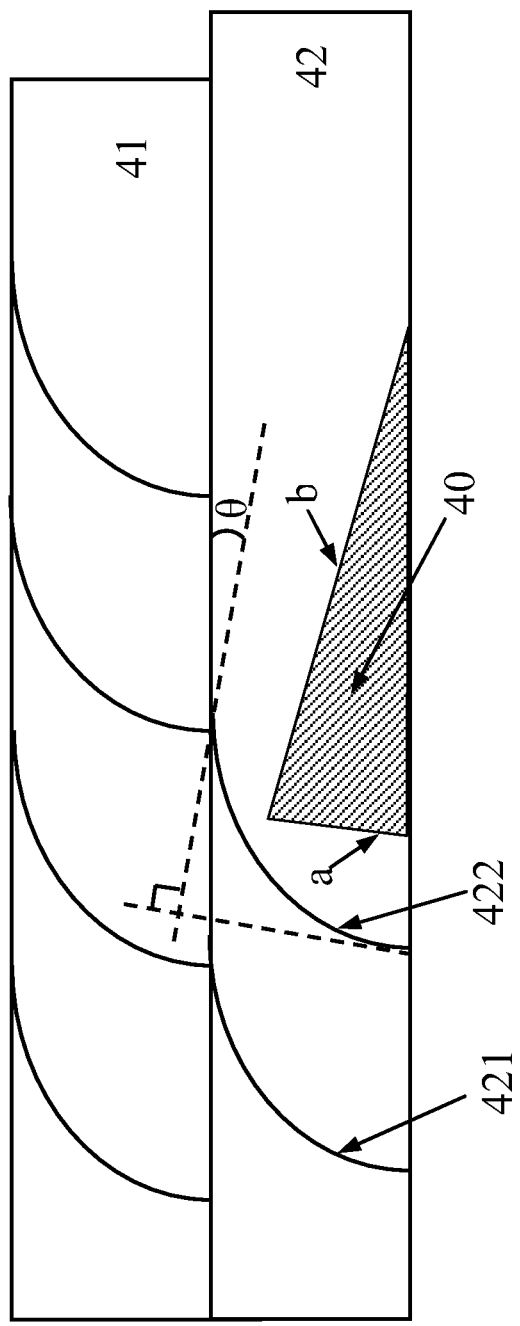
FIG. 4 is the definition of the skew angle to illustrate the erasing effect of magnetic writing pole on the previous recorded bit and the previous recorded track, when the skew angle varies.
Figure 5:
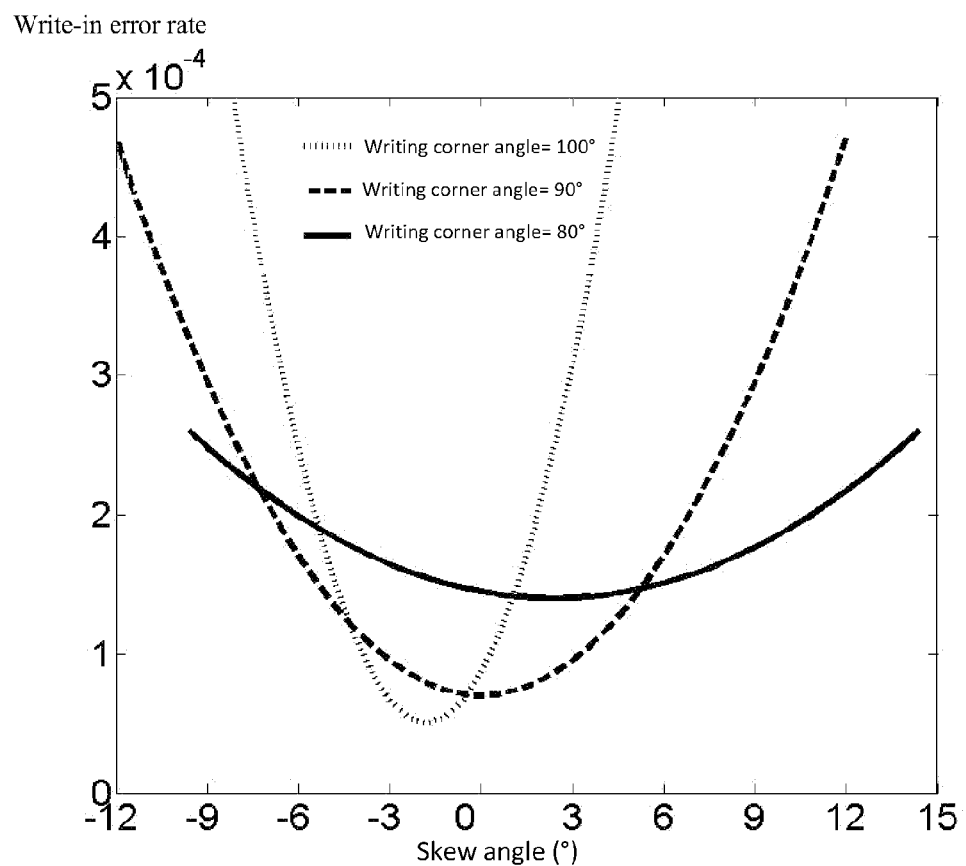
FIG. 5 is a curve illustrating relationship between the write-in error rate and the skew angle variation range.
Figure 6:
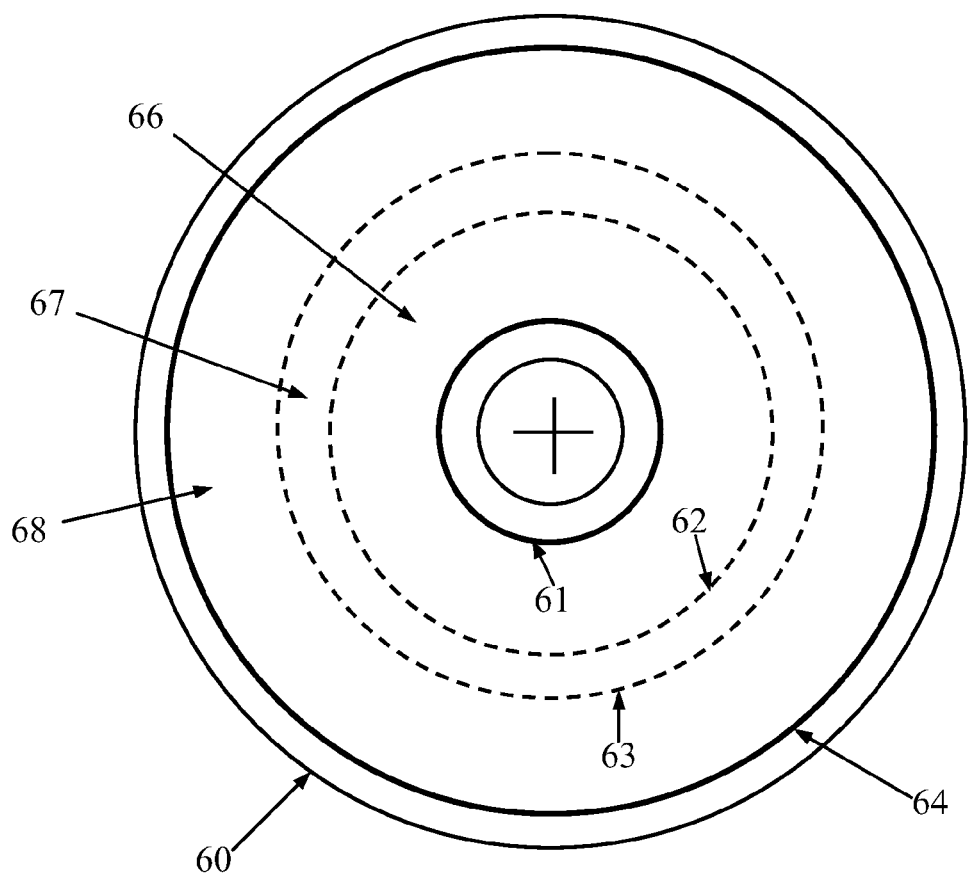
FIG. 6 is the illustration of different recording zones of the magnetic disk of the invention.

Firstly, terms of the invention are explained and interpreted as follows:

Inner recording zone (abbreviated as 'inner zone'): as shown in FIG. 6, a magnetic disk 60 is divided into three recording zones: an inner recording zone 66, a middle recording zone 67 (abbreviated as 'middle zone'), and an outer recording zone 68 (abbreviated as 'outer zone'), where different magnetic track boundaries are used as borders therebetween.

The inner recording zone 66 comprises all the magnetic tracks between the innermost track 61 of the magnetic disk and the inner boundary 62 of the middle zone.

Middle recording zone: in FIG. 6, the middle zone 67 comprises all the magnetic tracks between the inner boundary 62 of the middle zone and the outer boundary 63 of the middle zone.

Outer recording zone: In FIG. 6, the outer zone 68 comprises all the magnetic tracks between the outer boundary 63 of the middle zone and the outermost track 64 of the magnetic disk.

Inner writing corner (abbreviated as 'inner corner'): a writing corner used to record magnetic tracks in the inner zone.

Outer writing corner (abbreviated as 'outer corner'): a writing corner used to record magnetic tracks in the outer zone.

The inner boundary and the outer boundary of the middle recording zone are respectively the innermost and the outermost track boundaries of the magnetic track(s) in the middle recording zone. There could be only one track or multiple tracks in the middle recording zone.

Further description of the invention will be given below in conjunction with accompanying drawings and embodiments.

The invention employs a shingled magnetic recording method and a conventional recording method to write different recording zones of the magnetic disk via different writing corners of the magnetic writing pole, whereby reducing the skew angle variation range corresponding to each writing corner.

As shown in FIG. 6, the magnetic disk 60 is divided into three recording zones: an inner recording zone 66 (abbreviated as 'inner zone'), a middle recording zone 67 (abbreviated as 'middle zone'), and an outer recording zone (abbreviated as 'outer zone'), where different magnetic track boundaries are used as borders therebetween. The inner recording zone 66 is a data zone between the innermost track 61 of the magnetic disk and the inner boundary 62 of the middle zone thereof. The middle zone 67 is a data zone between the inner boundary 62 and the outer boundary 63. The outer zone 68 is a data zone between the outer boundary 63 and the outermost track 64 of the magnetic disk. The inner boundary and the outer boundary of the middle recording zone are respectively the innermost and the outermost track boundaries of the magnetic track(s) in the middle recording zone. There could be only one track or multiple tracks in the middle recording zone.

Figure 7:
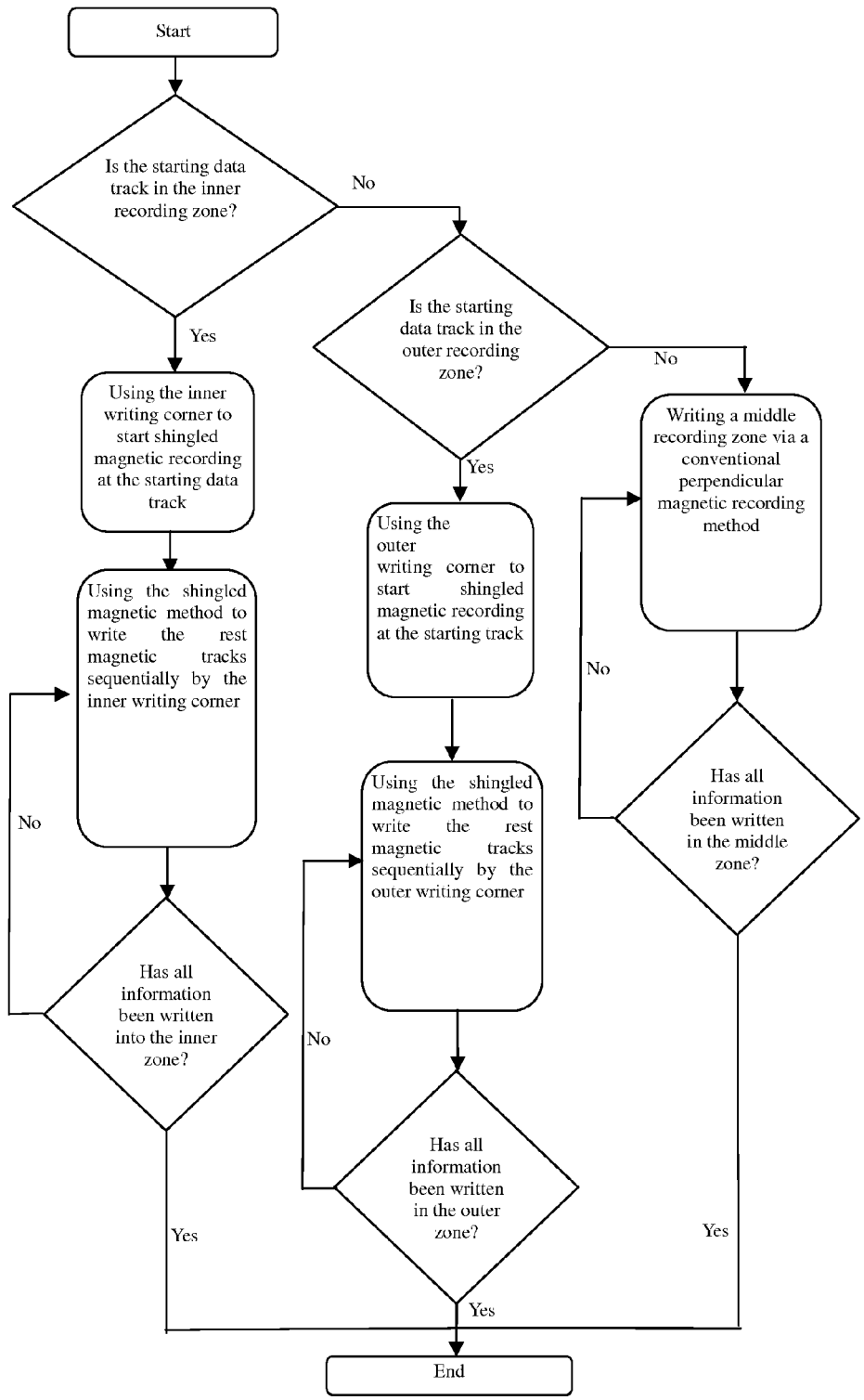
FIG. 7 is a flowchart illustrating the method for reducing the skew angle variation range corresponding to each writing corner of an embodiment of the invention.
Figure 8:
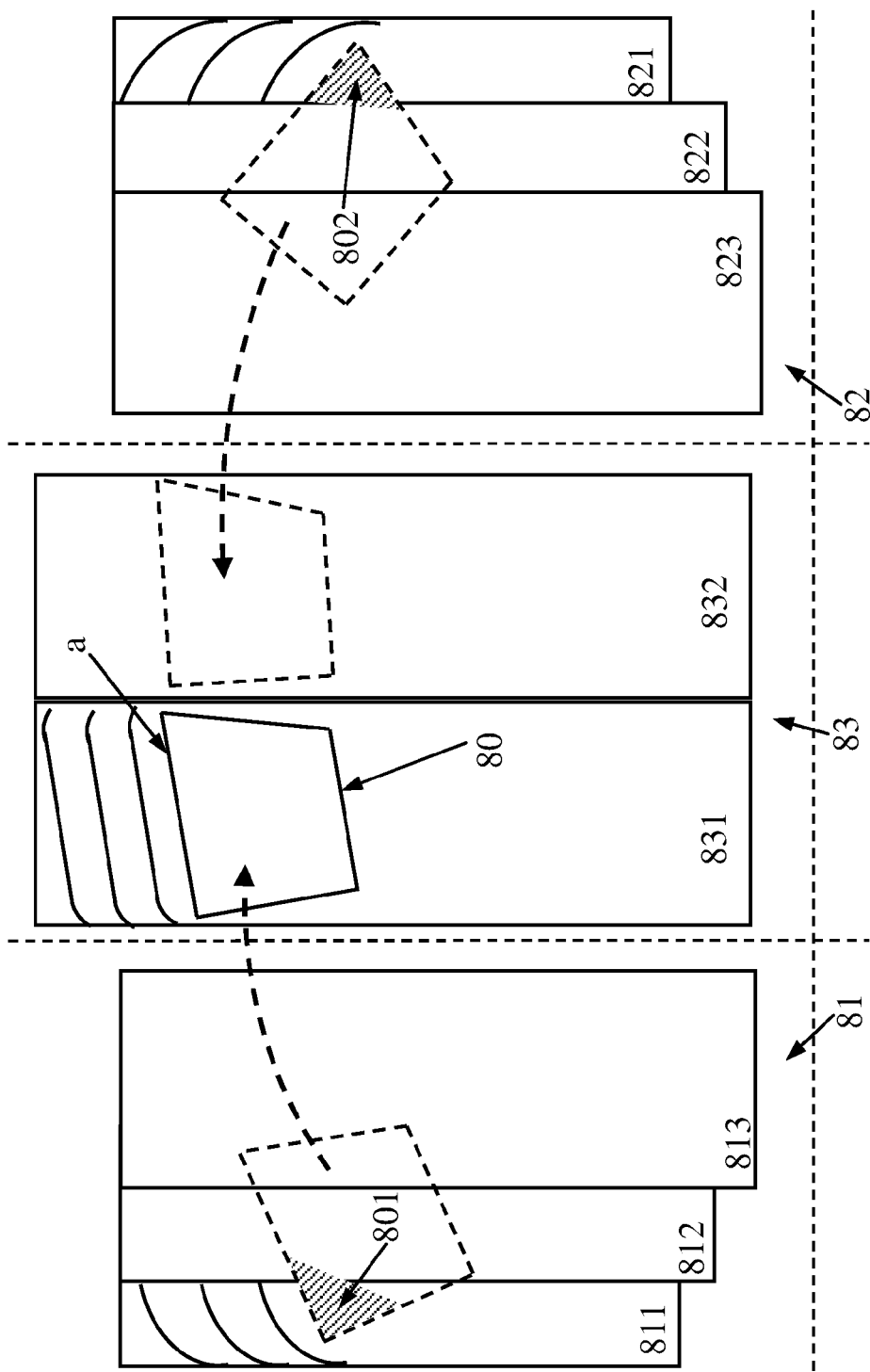
FIG. 8 illustrates how to use the dual-corner shingled writing method to reduce the skew angle corresponding to each writing corner variation range of an embodiment of the invention.

As shown in FIGS. 7 and 8, a method for reducing the skew angle variation range corresponding to each writing corner comprises steps of:

(1) determining whether the starting magnetic track required to be recorded is in an inner recording zone 81, if yes, the process proceeds to step (2), otherwise the process proceeds to step (4);

(2) using an inner writing corner 801 to start shingled magnetic recording at the starting magnetic track (indicated as a magnetic track 811 in FIG. 8), the process then proceeds to step (3);

(3) using the shingled magnetic method to sequentially write the rest magnetic tracks by the inner writing corner 801, keeping a magnetic writing pole 80 moving in a direction from the inner recording zone 81 to the outer recording zone 82, until all the information needing to be written into the inner recording zone 81 has been recorded, each time a current recording magnetic track overwriting part of a previous recorded magnetic track (for example, a magnetic track 812 partially overwrites the magnetic track 811, and a magnetic track 813 partially overwrites the magnetic track 812);

(4) determining whether the starting magnetic track required to be recorded is in an outer recording zone 82, if yes, the process proceeds to step (5), otherwise the process proceeds to step (7);

(5) using an outer writing corner 802 to start shingled magnetic recording at the starting magnetic track (for example, a magnetic track 821 in FIG. 8), the process then proceeds to step (6);

(6) using the shingled magnetic method to sequentially write the rest magnetic tracks by the outer writing corner 802, keeping the magnetic writing pole 80 moving in a direction from the outer recording zone 82 to the inner recording zone 81, until all the information needing to be written into the outer recording zone 82 has been recorded, each time a current recording magnetic track overwriting part of a previous recorded magnetic track (for example, a magnetic track 822 partially overwrites the magnetic track 821, and a magnetic track 823 partially overwrites the magnetic track 822); and (7) writing a middle recording zone 83 via a conventional perpendicular magnetic recording method by the magnetic writing pole 80; in details, the magnetic writing pole 80 moves to the magnetic track (for example, a magnetic track 831 in FIG. 8) needing to be recorded in the middle zone, using a trailing edge (an edge 'a' of the magnetic writing pole 80 in FIG. 8) of the magnetic writing pole to record the magnetic, then moves to the next magnetic track (for example, a magnetic track 832) needing to be recorded in the middle zone to record via the trailing edge, and so on, until all the information needing to be written into the middle recording zone 83 is finished. Being different from the inner recording zone and the outer recording zone, the magnetic tracks in the middle recording zone do not overwrite each other. The middle recording zone could be rather small and can correspond to the pole width of the writing head only.

The method reduces the skew angle variation range corresponding to each writing corner, and thus decreasing the write-in error rate of the system: since steps (3) and (6) are used, the magnetic writing pole uses different writing corners to write different recording zones of the magnetic disk, the skew angle variation range in different recording zones is smaller than that of writing the whole magnetic disk by one writing corner only. Therefore, the invention reduces the skew angle variation range corresponding to each writing corner, thus decreasing the write-in error rate of the system.

Figure 9:
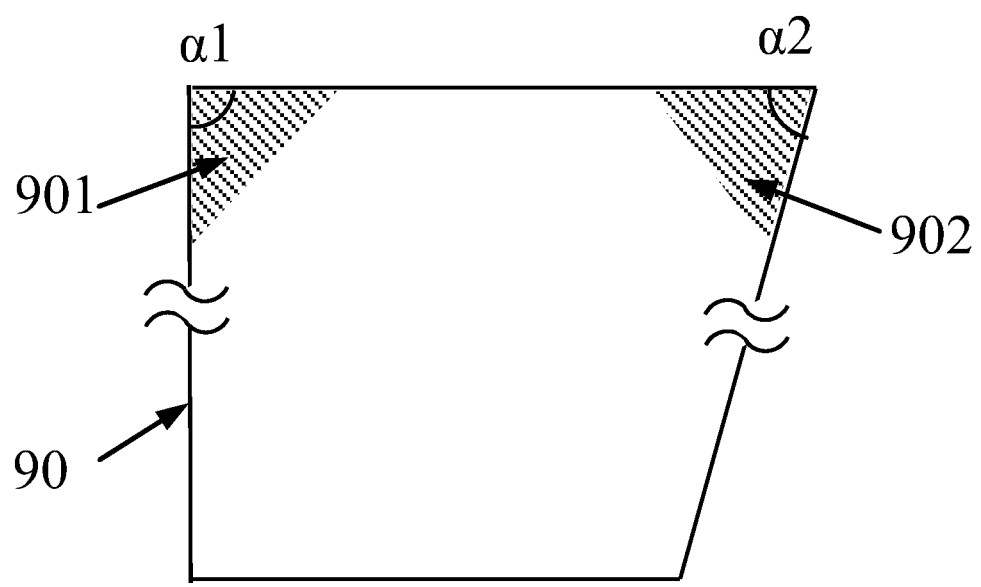
FIG. 9 illustrates an ABS view of a magnetic writing pole with two adjustable writing corners of another embodiment of the invention.

FIG. 9 illustrates an air bearing surface (ABS) view of a magnetic writing pole using the dual-corner shingled magnetic recording method illustrated in FIG. 7 and FIG. 8. The magnetic writing pole 90 comprises an inner writing corner 901, and an outer writing corner 902. Angle $\alpha 1$ of the inner writing corner 901 is adjustable between 50° and 120°, angle $\alpha 2$ of the outer writing corner 902 is adjustable between 50° and 120°, and the angle values of $\alpha 1$ and $\alpha 2$ are independent to each other.

Advantages of the magnetic writing pole 90 comprise: since two adjustable writing corners are used to record different zones of the magnetic disk respectively, the skew angle variation range corresponding to each writing corner is reduced, and thus the write-in error rate of the shingled magnetic recording system is decreased.

Figure 10:
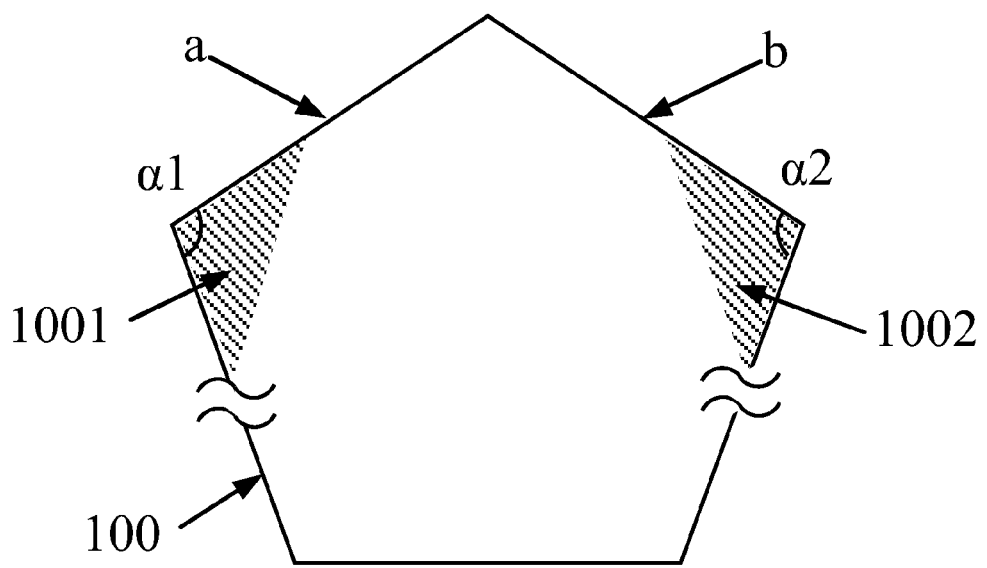
FIG. 10 illustrates an ABS view of another magnetic writing pole with two adjustable writing corners of a further embodiment of the invention.

FIG. 10 illustrates an air bearing surface (ABS) view of another magnetic writing pole using the dual-corner shingled magnetic recording method illustrated in FIG. 7 and FIG. 8. The magnetic writing pole 100 comprises an inner writing corner 1001, and an outer writing corner 1002. Angle $\alpha 1$ of the inner writing corner 1001 is adjustable between 50° and 120°, and angle $\alpha 2$ of the outer writing corner 1002 is adjustable between 50° and 120°. An original skew angle (namely the skew angle as the inner writing corner 1001 writes the innermost track of the magnetic disk) corresponding to the inner writing corner 1001 is adjustable between −30° and 30° via an edge 'a', and an original skew angle (namely the skew angle as the outer writing corner 1002 writes the outermost track of the magnetic disk) corresponding the outer writing corner 1002 is adjustable between −30° and 30° via an edge 'b'.

Advantages of the magnetic writing pole 100 comprise: since two adjustable writing corners are used to record different zones of the magnetic disk, and original skew angles of the two writing corners can be adjusted, the skew angle variation range corresponding to each writing corner is reduced, and thus the write-in error rate of the shingled magnetic recording system is decreased.

It should be noted that for the structures of the magnetic writing poles in FIGS. 9 and 10, parts irrelevant to the writing corners can be of any possible shape. Specifically, lower half parts (namely parts under the broken symbol) of the magnetic writing poles in FIGS. 9 and 10 can be of any possible shape.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for reducing skew angle variation range in a shingled magnetic recording system, the method comprising the following steps:

1) determining whether a starting magnetic track is in an inner recording zone, if yes, the process proceeds to step (2), otherwise the process proceeds to step (4);
2) using an inner writing corner to start shingled magnetic recording at a starting track, the process then proceeds to step (3);
3) using a shingled magnetic method to write rest magnetic tracks sequentially by the inner writing corner, keeping a writing pole moving in a direction from an inner recording zone to an outer recording zone, until all the information needing to be written into the inner recording zone has been recorded;
4) determining whether the starting magnetic track is in the outer recording zone, if yes, the process proceeds to step (5);
5) using an outer writing corner to start shingled magnetic recording at the starting track, the process then proceeds to step (6); and
6) using the shingled magnetic method to write the rest magnetic tracks sequentially by the outer writing corner, keeping the writing pole moving in a direction from the outer recording zone to the inner recording zone, until all the information needing to be written into the outer recording zone has been recorded.

2. The method of claim 1, wherein
a) said inner recording zone comprises all the magnetic tracks between an innermost track of a magnetic disk and an inner boundary of a middle recording zone thereof;
b) said outer recording zone comprises all the magnetic tracks between an outer boundary of said middle recording zone and an outermost track of the magnetic disk; and
c) said middle recording zone comprises all the magnetic tracks between the inner boundary of said middle recording zone and the outer boundary magnetic track of said middle recording zone.

3. The method of claim 2, wherein
a) said inner boundary of said middle recording zone is the innermost track boundary of the tracks in the middle recording zone, and said outer boundary of said middle recording zone is the outermost track boundary of the tracks in the middle zone;
b) there is only one track or multiple tracks in the middle recording zone, said inner boundary of said middle recording zone and said outer boundary of said middle recording zone are the boundaries of the same magnetic track if said middle recording zone is of one track only, or the innermost track boundary and the outermost track boundary of the magnetic tracks in said middle recording zone if said middle recording zone is of multiple tracks;
c) said inner boundary of said middle recording zone is an inner boundary of any magnetic track except said innermost track of the disk, and said outer boundary of said middle recording zone is the outer boundary of any magnetic track except said outermost track of the disk; and
d) said inner boundary of said middle recording zone is closer to said innermost track of the magnetic disk than said outer boundary of said middle recording zone.

4. A magnetic writing pole, said magnetic writing pole employing the method of claim 1 for reducing a skew angle variation range thereof.

5. The magnetic writing pole of claim 4, comprising the inner writing corner, and the outer writing corner, wherein a) angle $\alpha 1$ of said inner writing corner is adjustable between 50° and 120°; and
b) angle $\alpha 2$ of said outer writing corner is adjustable between 50° and 120°.

6. The magnetic writing pole of claim 4, comprising the inner writing corner, and the outer writing corner, wherein
a) angle $\alpha 1$ of said inner writing corner is adjustable between 50° and 120°;
b) angle $\alpha 2$ of said outer writing corner is adjustable between 50° and 120°;
c) an original skew angle corresponding to said inner writing corner is adjustable between −30° and 30°; and
d) an original skew angle corresponding to said outer writing corner is adjustable between −30° and 30°.

\* \* \* \* \*